United States Patent Office 2,767,159
Patented Oct. 16, 1956

2,767,159

COPPER SALTS OF ORGANIC ACIDS AS CATALYSTS FOR THE POLYMERIZATION OF POLYMERIZABLE HETEROCYCLIC NITROGEN COMPOUNDS

Mack F. Potts, Bartlesville, Okla., and Paul S. Hudson, Iowa City, Iowa, assignors to Phillips Petroleum Company, a corporation of Delaware No Drawing. Application October 27, 1952, Serial No. 317,142

13 Claims. (Cl. 260—88.3)

This invention relates to the production of polymeric materials. In one of its aspects this invention relates to an improved process for the catalytic polymerization of polymerizable heterocyclic nitrogen compounds. In another of its aspects this invention relates to an improved process for the catalytic polymerization of vinylpyridines. In still another of its aspects this invention relates to a class of compounds useful as catalysts in the polymerization of polymerizable heterocyclic nitrogen compounds. In yet another of its aspects this invention relates to an improved process for the separation of alkenylpyridines from admixture with alkylpyridines.

Each of the objects of this invention will be obtained by at least one of the aspects of this invention.

It is an object of this invention to provide an improved process for the production of polymeric materials. Another object of this invention is to provide an improved process for the catalytic polymerization of polymerizable heterocyclic nitrogen compounds. Still another object of this invention is to provide an improved process for the catalytic polymerization of vinylpyridines. A further object of this invention is to provide a class of compounds useful as catalysts for the polymerization of polymerizable heterocyclic nitrogen compounds. Another object of this invention is to provide an improved process for the separation of alkenylpyridines from admixture with alkylpyridines. Further and additional objects of this invention will be apparent to those skilled in the art upon study of the accompanying disclosure.

We have discovered a class of compounds useful as catalysts in the polymerization of polymerizable heterocyclic compounds. In accordance with our invention copper salts of organic acids can be employed as polymerization catalysts for the polymerization of polymerizable heterocyclic nitrogen compounds. These copper salts include the cupric and cuprous salts of saturated aliphatic mono- and polybasic acids containing not more than 18 carbon atoms per molecule as well as cupric and cuprous salts of aromatic and heterocyclic mono- and polybasic acids. Specific examples of these materials include cupric and cuprous salts of acetic, propionic, lauric, stearic, succinic, benzoic, phthalic, naphthenic, and nicotinic acids, pyridine dicarboxylic acids, and the like. The copper salts employed are preferably but not necessarily soluble in the polymerizable heterocyclic nitrogen compound being polymerized. The amount of catalyst employed is generally in the range between 0.05 and 10 weight percent, preferably 0.1 and 0.5 weight percent based on the polymerizable heterocyclic nitrogen compound. The amount of catalyst employed will in general depend on the amount of polymerizable material in the reaction mixture. If a smaller amount of polymerizable material is present a greater amount of catalyst is employed.

According to the process of this invention a polymerizable heterocyclic nitrogen compound can be polymerized by heating it at a temperature in the range between 100 and 600° F., preferably between 150 and 400° F., in the presence of a copper salt of an organic acid as hereinbefore described which is preferably soluble in the compound being polymerized. The reaction can be effected in any manner such as refluxing at atmospheric pressure or by heating the materials in a closed system. The time required to effect polymerization is dependent upon the reaction conditions and the particular compound being polymerized as well as the particular catalysts employed. Generally, the time is in the range from 30 minutes to 20 hours, preferably from 1 to 10 hours. Polymerization can be carried out by merely adding the catalyst, in an amount as hereinbefore described, to the compound to be polymerized and heating the mixture to the desired temperature for the requisite period to effect reaction. It is frequently preferred to operate in this manner in an anhydrous system. If desired, a solvent, inert under the reaction conditions, can be employed as a reaction medium. Hydrocarbon solvents such as pentanes, hexanes, heptanes, methylcyclohexane, benzene, toluene, and xylenes, can be employed as well as halogenated solvents such as chloroform and carbon tetrachloride, and various other materials. Polymerization of alkenylpyridines can also be effected in the presence of alkylpyridines. The process of this invention can also be carried out in the presence of water. While it is generally preferred that the amount of water not exceed that which will dissolve in the polymerizable heterocyclic nitrogen compound, in order that the system may remain in a single phase, larger amounts of water can be used if desired. Generally, the amount of water should not exceed 15 percent by weight of the polymerizable heterocyclic nitrogen compound employed.

Preferred polymerizable heterocyclic nitrogen compounds which can be polymerized in accordance with our invention are the mono- and divinylpyridines, with the vinyl group being present in any of the several positions in the pyridine nucleus. Alkyl groups can be present on the ring or on the alpha-carbon atom of the vinyl group, but the number of carbon atoms in the combined alkyl groups should generally not be greater than 12. These alkyl groups are preferably methyl and ethyl groups. These preferred vinylpyridine compounds have the structural formula:

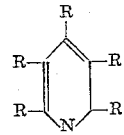

where R is selected from the group consisting of hydrogen, alkyl, vinyl, and isopropenyl (alpha-methylvinyl) groups; and the total number of carbon atoms in the alkyl groups being not greater than 12. Examples of such compounds are 2-vinylpyridine; 3-vinylpyridine; 4-vinylpyridine; 2,5-divinylpyridine; 2-methyl-5-vinylpyridine; 2-vinyl-5-ethylpyridine; 2,3,4-trimethyl-5-vinylpyridine; 3,4,5,6-tetramethyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl-3-vinylpyridine; 3-dodecyl-4,5-divinylpyridine; 2,4-dimethyl-5,6-dipentyl-3-vinylpyridine; 2-decyl-5-(alpha-methylvinyl) pyridine; 3,5-di(alpha-methylvinyl) pyridine; and the like. Polymerization can be effected with a single vinylpyridine or with a mixture of vinylpyridines to give products having different characteristics.

Those skilled in the art will appreciate that for the purposes of this invention the polymerizable heterocyclic nitrogen compounds of the above nature can be substituted with non-interfering groups as for example halo- and nitro-groups.

Other polymerizable heterocyclic nitrogen compounds which can be employed in the practice of this invention include those heterocyclic nitrogen compounds substituted by at least one and not more than two of a radical selected from the group consisting of vinyl and alpha-methylvinyl. The ring structure of these vinyl and alpha-methylvinyl substituted heterocyclic nitrogen compounds can be unsaturated, partially saturated and completely saturated. Examples include vinyl and alpha-methylvinyl substituted quinolines, isoquinolines, piperidines (hexahydropyridines), pyrroles, pyrrolidines, pyrrolidones, especially the vinyl-substituted pyrrolidones, piperidines, pyrroles, pyrrolidines, quinolines, isoquinolines, dihydro and tetrahydropyridines, partially hydrogenated quinolines and isoquinolines, and pyrrolines (dihydropyrroles), and the alkyl derivatives of the foregoing compounds. Examples of such compounds are 2-vinylquinoline; 8-ethyl-2-vinylquinoline; 4-hexyl-5-vinylquinoline; 1-vinylisoquinoline; 5-methyl-1-isopropenyl-isoquinoline; 1,8-divinylisoquinoline; N-vinylpyrrolidone; 3-vinylpyrrolidone; N-vinylpyrrole; 3-vinylpyrrole; 3-vinylpiperidine; N-vinylpyrrolidine; 3-vinylpyrrolidine; N-vinylcarbazole; and 5-vinylcarbozole and the like.

The process of this invention is valuable for use in the production of thermoplastic resins which are suitable for the manufacture of various molded articles. The process can also be employed for the separation of vinylpyridines from mixtures of vinylpyridines and alkylpyridines by polymerizing the vinylpyridines and removing the alkylpyridines from the mixture by distillation.

The following examples set forth hereinafter are illustrative of specific embodiments of this invention and it is to be understood that the invention is not to be unduly limited by the specific examples shown.

*Example I*

2-methyl-5-vinylpyridine was heated in a nitrogen atmosphere at 200° F. for 2.5 hours in the presence of 0.25 percent by weight of cupric acetate. At the end of this period 100 percent polymerization had occurred.

A sample of 2-methyl-5-vinylpyridine was heated in a nitrogen atmosphere at 185° F. for 24 hours. No catalyst was present. At the end of this period 23 percent polymerization had occurred.

*Example II*

Polymerization tests were made by adding 0.25 weight percent cupric acetate based on the total mixture to 2-methyl-5-vinylpyridine, 2-methyl-5-vinylpyridine containing 5 weight percent water, styrene, and styrene containing 5 weight percent water. The samples were heated at 200° F. A fifth run was made in which styrene was heated at the same temperature in the absence of cupric acetate. The following results were obtained:

| Material Tested | Result |
|---|---|
| 2-Methyl-5-vinylpyridine | Solid in 4 hours; substantially completely polymerized. |
| 2-Methyl-5-vinylpyridine + 5% water | Do. |
| Styrene | Slight increase in viscosity after 24 hours. |
| Styrene + 5% water | Do. |
| Styrene in absence of cupric acetate | Solid in 24 hours. |

These data show that while cupric acetate catalyzes the polymerization of 2-methyl-5-vinylpyridine, it appears to inhibit the polymerization of styrene when the mixture is heated under similar conditions.

*Example III*

Two samples of 2-methyl-5-vinylpyridine, one without water and the other containing 5 percent by weight of water, were heated at 200° F. in a nitrogen atmosphere in the presence of 0.25 percent by weight of cupric naphthenate based on the total mixture. Both samples were solid after a 4-hour heating period. They were substantially completely polymerized.

*Example IV*

A mixture containing 5 weight percent 2-methyl-5-vinylpyridine and 95 weight percent 2-methyl-5-ethyl-pyridine was refluxed at atmospheric pressure (332° F.) for three hours in the presence of 0.4 percent cupric acetate based on the total mixture. Complete polymerization of the 2-methyl-5-vinylpyridine was effected. The 2-methyl-5-ethylpyridine can be readily removed from this mixture by distillation.

A comparative run was made under identical conditions except that no cupric acetate was present. Only 20.9 percent of the 2-methyl-5-vinylpyridine was polymerized after refluxing for three hours.

As will be obvious to those skilled in the art many substitutions, variations, and modifications can be made in the light of the foregoing disclosure without departing from the spirit or scope of this invention.

We claim:

1. A process for the production of polymeric materials which comprises subjecting at least one vinylpyridine of the formula

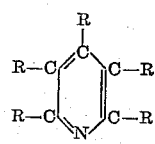

wherein R is selected from the group consisting of hydrogen, alkyl, vinyl, and alpha-methylvinyl groups, at least one and not more than two of said groups being selected from the group consisting of vinyl and alpha-methylvinyl and the total number of carbon atoms in the alkyl groups being not greater than 12, to the action of a copper salt of an unsubstituted organic acid selected from the group consisting of saturated aliphatic mono- and polybasic acids, aromatic mono- and polybasic acids and heterocyclic mono- and polybasic acids as the sole polymerization catalytic agent.

2. A process for the production of polymeric materials which comprises subjecting at least one vinylpyridine of the formula

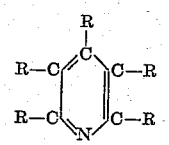

wherein R is selected from the group consisting of hydrogen, alkyl, vinyl, and alpha-methylvinyl groups at least one and not more than two of said groups being selected from the group consisting of vinyl and alpha-methylvinyl and the total number of carbon atoms in the alkyl groups being not greater than 12, to the action of a copper salt of an unsubstituted organic acid selected from the group consisting of saturated aliphatic mono- and polybasic acids, aromatic mono- and polybasic acids, and heterocyclic mono- and polybasic acids as the sole polymerization catalytic agent, said salts being present in an amount in the range of 0.05 and 10 weight percent based on the vinylpyridine compound.

3. A process for the production of polymeric materials which comprises subjecting at least one vinylpyridine of the formula

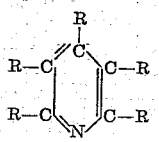

wherein R is selected from the group consisting of hydrogen, alkyl, vinyl, and alpha-methylvinyl groups, at least one and not more than two of said groups being selected from the group consisting of vinyl and alpha-methylvinyl and the total number of carbon atoms in the alkyl groups being not greater than 12, to the action of a copper salt of an unsubstituted organic acid selected from the group consisting of saturated aliphatic mono- and polybasic acids, aromatic mono- and polybasic acids and heterocyclic mono- and polybasic acids as the sole polymerization catalytic agent, said copper salt being present in an amount in the range between 0.05 and 10 weight percent based on the vinylpyridine compound, at a temperature in the range between 100 and 600° F. for a period in the range of 30 minutes to 20 hours.

4. The process according to claim 3 in which the vinylpyridine is 2-methyl-5-vinylpyridine.

5. The process according to claim 3 in which the vinylpyridine is 4-vinylpyridine.

6. The process according to claim 3 in which the vinylpyridine is 2-vinylpyridine.

7. The process according to claim 3 in which the vinylpyridine is 2-vinyl-5-ethylpyridine.

8. The process according to claim 3 in which the vinylpyridine is 2-methyl-5-alpha-methylvinylpyridine.

9. The process according to claim 3 in which the catalyst employed is cupric acetate.

10. The process according to claim 3 in which the catalyst employed is cupric naphthenate.

11. The process according to claim 3 in which the catalyst employed is cupric stearate.

12. The process according to claim 3 in which the catalyst employed is cupric succinate.

13. The process according to claim 3 in which the catalyst employed is cupric benzoate.

References Cited in the file of this patent
UNITED STATES PATENTS

| | | |
|---|---|---|
| 1,640,975 | Brown | Aug. 30, 1927 |
| 1,881,282 | Lawson et al. | Oct. 4, 1932 |
| 2,388,372 | Stewart | Nov. 6, 1945 |
| 2,388,373 | Stewart | Nov. 6, 1945 |
| 2,397,580 | Ward | Apr. 2, 1946 |
| 2,535,557 | Walton | Dec. 26, 1950 |
| 2,589,258 | Howard | Mar. 18, 1952 |
| 2,610,965 | Vandenberg | Sept. 16, 1952 |
| 2,642,410 | Hoppens | June 16, 1953 |